March 27, 1945.  A. W. ROHLEN  2,372,395
VEHICLE TURN INDICATOR
Filed July 14, 1941   3 Sheets-Sheet 1
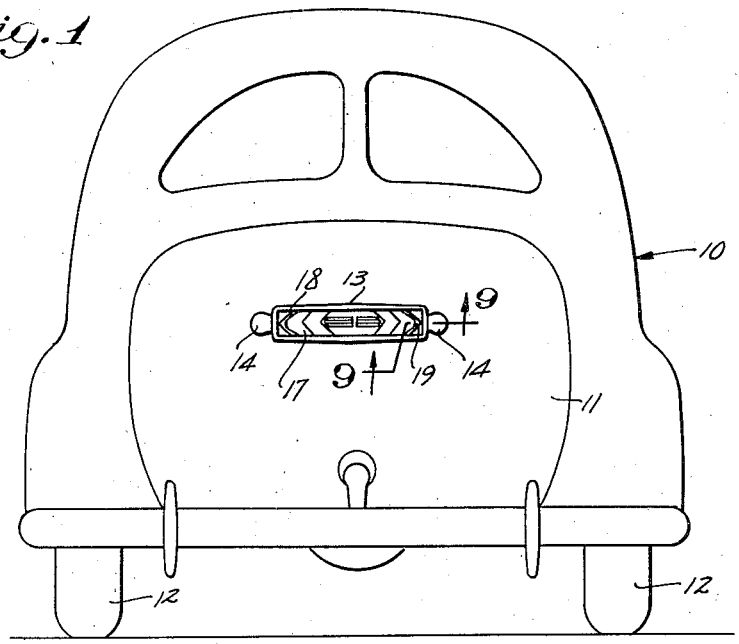
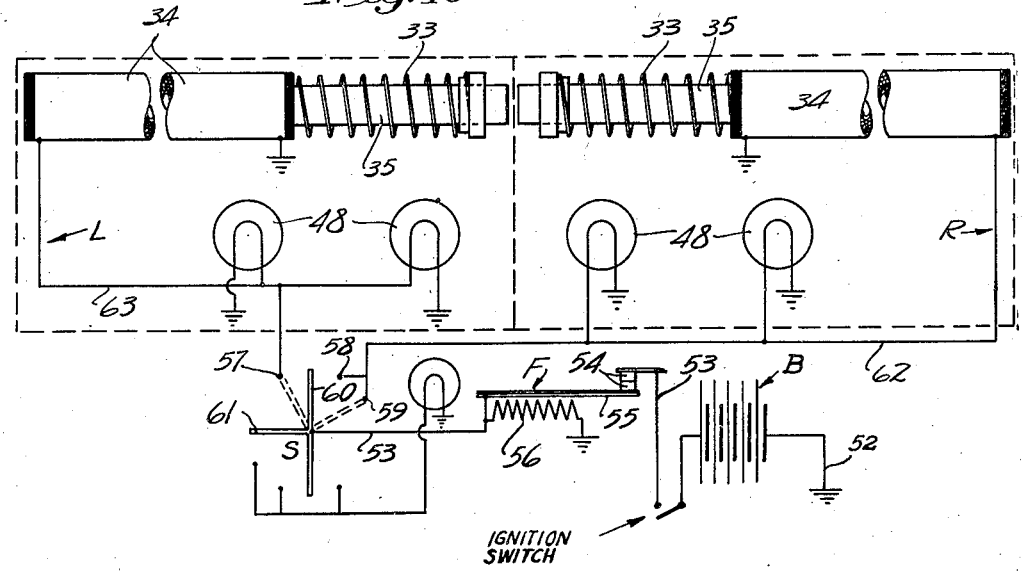
Inventor
Arthur W. Rohlen
By his Attorneys

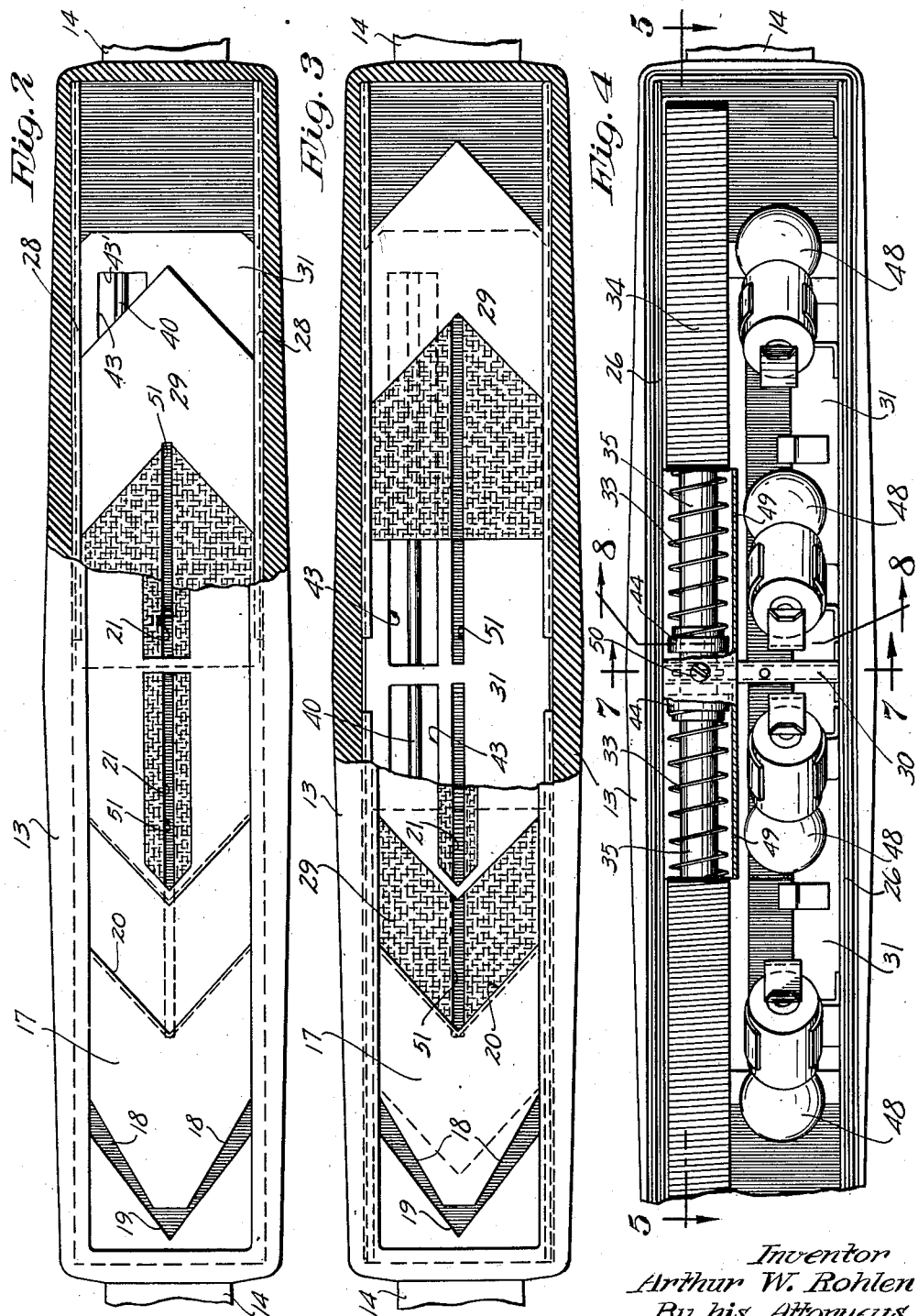

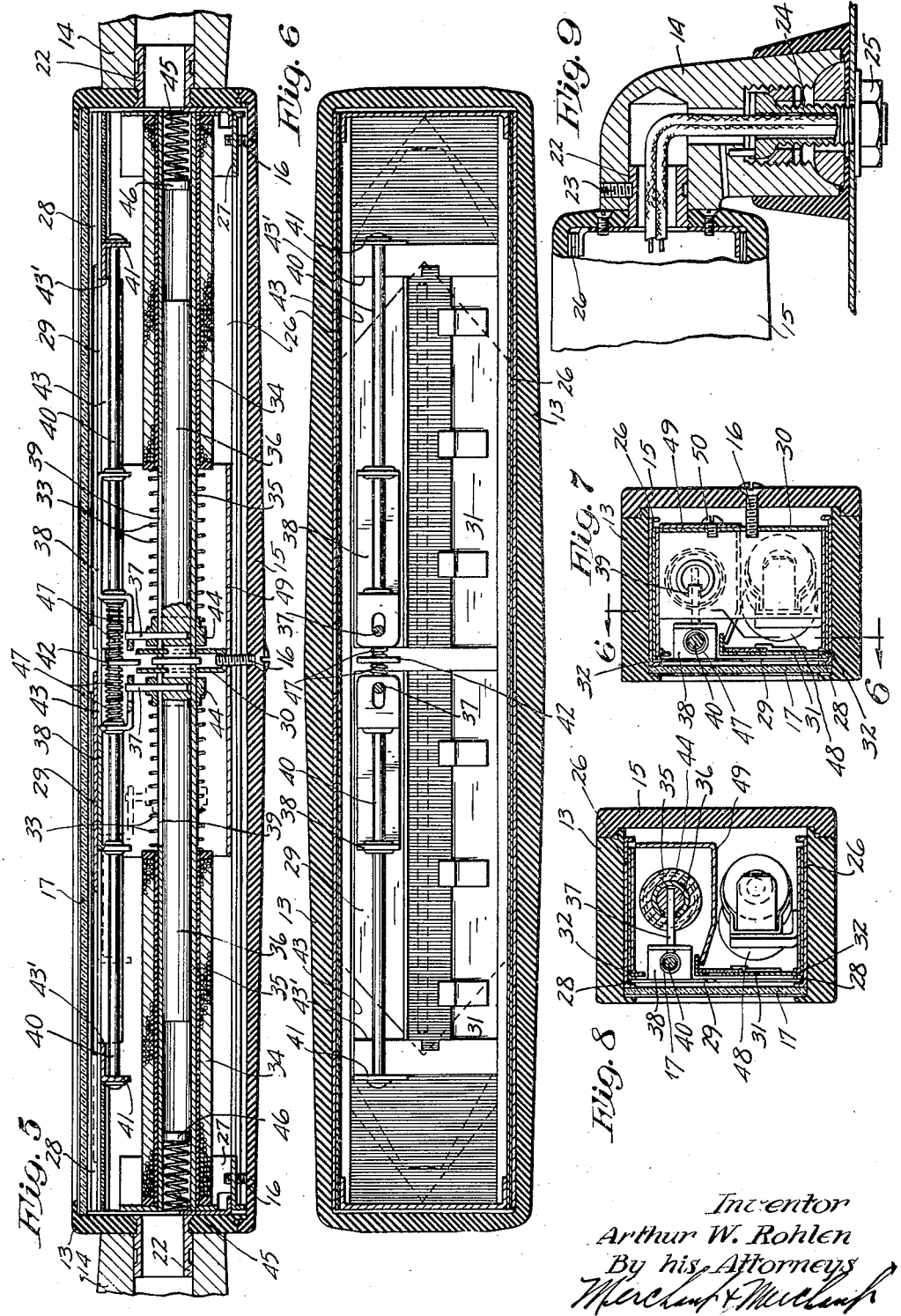

Patented Mar. 27, 1945

2,372,395

UNITED STATES PATENT OFFICE 2,372,395

VEHICLE TURN INDICATOR

Arthur W. Rohlen, Minneapolis, Minn., assignor to Marvel Auto Signal Co., Inc., Minneapolis, Minn., a corporation of Minnesota Application July 14, 1941, Serial No. 402,279

10 Claims. (Cl. 177—327)

My present invention relates to an improved system for indicating a vehicle operator's intention to turn in a predetermined direction.

Although the direction turn indicator or signal art is very old, there appears to have been a long standing but unfilled demand for a signalling device for vehicles by means of which a vehicle operator could send out a visual indication of his intention to turn and the direction thereof which would be highly effective under all conditions of light or darkness. In the past those signal devices which were most highly effective under conditions of bright daylight were very ineffective or highly inefficient under conditions of darkness; and those devices which were most effective under conditions of extreme darkness were relatively ineffective or very inefficient under conditions of bright daylight.

Therefore, an object of the present invention is the provision of an indicating device which may be mounted on a vehicle under control of the operator of the vehicle and which will produce a visual direction of turn indication that is equally effective and can be seen at a safe distance under all varying conditions of light and darkness, and to this end the present invention provides an improved indicating method as well as a novel apparatus for carrying out the improved or new method.

In carrying out the invention according to the preferred example herein illustrated and described in detail, I provide simultaneous direction indicating signals by the processes of direct projection of locally generated light and the reflection of remotely generated light. In the preferred embodiments of the invention the warning signals produced by the processes of projection and reflection are repeatedly flashed on and off in timed relation, preferably simultaneously. I find that the most satisfactory results are obtained by flashing these warning signals, produced one by the process of projection and the other by the process of reflection, simultaneously. Still further I have found that the effectiveness of the dual indication can be improved greatly by moving one of these dual indications or signals longitudinally of the direction of indication.

The above and other highly important objects and advantages of the invention will be made apparent from the following specification and claims and appended drawings. In the accompanying drawings like characters indicate like parts throughout the several views.

Referring to the drawings:

Fig. 1 is a rear view of an automobile having one of the improved signalling devices mounted thereon;

Fig. 2 is an enlarged view of the normally exposed face of the signalling device with some parts broken away and some parts shown in section;

Fig. 3 is a view substantially corresponding to Fig. 2 but showing certain of the parts in an opposite extreme position from that shown in Fig. 2;

Fig. 4 is a similar enlarged view of the signalling device turned 180° with respect to Figs. 2 and 3 and with the cover plate removed;

Fig. 5 is a longitudinal sectional view taken approximately on the line 5—5 of Fig. 4;

Fig. 6 is a longitudinal sectional view taken on the irregular vertical line 6—6 of Fig. 7, some parts being omitted;

Fig. 7 is a transverse sectional view taken on the line 7—7 of Fig. 4;

Fig. 8 is a transverse sectional view taken on the line 8—8 of Fig. 4; and

Fig. 9 is a similar enlarged detail view taken approximately on the irregular line 9—9 of Fig. 1; and Fig. 10 is a diagrammatic view illustrating the electrical hook-up of the apparatus.

In the drawings the automobile body is indicated as an entirety by the numeral 10, the cover of the trunk or luggage compartment thereof by 11, and the rear wheels by 12. The mechanism of the signal device proper is located within a suitable casing or housing 13 which is shown as mounted on the outside of the luggage compartment cover 11 through the medium of tubular elbow-like mounting brackets 14, one at each end of the casing. The unexposed side of the casing 13 located adjacent the vehicle body is made primarily open but is normally closed and sealed by a suitable cover plate 15 that is detachably held in place by means of a screw or screws 16. The outer or exposed side of the casing 13, while primarily made open, is normally closed by a wall-forming element 17. This wall-forming element 17, while largely opaque, is formed with a group of light apertures 18 and 19 adjacent either end thereof arranged in a pattern more or less resembling the head of an arrow and therefore indicating direction. The opposite groups of light pervious apertures 18 and 19, it will be noted, point in opposite directions, each group toward its respective end of the casing. Intermediate the groups of light apertures 18 and 19 the opaque wall element 17 is provided with light apertures 20, each of which is of a pattern or shape more or less resembling the head of an arrow pointed in the direction of its end of the casing. The light apertures 20 are preferably vertically centered with respect to the groups of apertures 18 and 19.

Intermediate the apertures 20 the wall element 17 is provided with longitudinally extended arrow shaft-forming light passages 21.

The exposed wall element 17 of the preferred embodiment of the invention herein illustrated is primarily formed of a clear glass sheet, and the outer surface of this clear glass sheet is rendered opaque at all portions surrounding the light apertures 18, 19, 20 and 21, by application of dull black paint to the outer surface thereof, while spaces thereon corresponding to the shapes of the apertures 18 to 21 inclusive are masked out. The casing thus formed is water tight and is opaque or light impervious except for the intentionally provided transparent or light pervious signal apertures 18, 19, 20 and 21. This casing is preferably of molded plastic material and has rigidly but detachably secured to and from each end thereof a tubular mounting sleeve 22, preferably of brass or similar material. These sleeves 22 open into the ends of the casing and serve as anchors for the elbow-like tubular mounting brackets 14, which latter telescope over the sleeves 22 and are held in place thereon by lock or set screws 23. Suitably anchored in the other ends of the tubular mounting brackets 14 are threaded anchoring sleeves 24 that extend through suitable mounting holes in the vehicle body, in the present instance that portion of the body forming the cover plate 11, and are anchored thereto by washer-equipped bolts 25.

A metallic lining 26 is snugly fitted within the plastic outer casing, and this lining, it will be noted, is largely open adjacent the exposed light aperture-equipped wall 17 of the casing and is almost completely open adjacent the opposite or inner wall of the casing, although the top and bottom thereof are substantially complete. The opposite ends of this lining are formed just under the cover plate 15 at opposite ends of the casing to provide anchoring flanges 27 in which the anchoring screws 16 are threaded.

Mounted in suitable guideways 28 at the top and bottom of the casing, and which guideways 28 extend in close parallel relation to the translucent light apertured wall 17 of the casing, is a pair of opaque movable shutter elements 29. These shutter elements 29 are normally positioned with their adjacent ends nearly touching, and in which position each thereof covers an aperture 20 and an adjacent cooperating aperture 21. The outwardly facing surfaces of the shutter elements 29 are colored dull black on those parts thereof that are exposed to the apertures 20 when the said shutter elements are in their above described normal or retracted positions; and those portions of the outer surface of the shutter elements 29 longitudinally inward of the apertures 21 are of a bright yellow. The shutter elements 29 are movable longitudinally of the casing and, hence, longitudinally of the direction of turn indications between their retracted positions above defined and shown in Fig. 2 to opposite extreme positions wherein the bright yellow surface portions of the shutter elements are exposed to their respective cooperating signal apertures 20. Of course, in the retracted positions of the shutters, the yellow surfaces thereof are exposed to the shaft-like apertures 21 and in their extended or fully operative positions of the shutter shown in Fig 3, the highly reflective yellow surfaces of the shutters 29 are exposed to and register with their respective cooperating direction indicating light apertures 20.

Attention is here directed to the fact that the casing 13 is provided interiorly with a transversely extended partition 30 located at its longitudinal center but which, it will be noted, terminates considerably short of the front and back interior walls of the casing. All of the parts located at one side of the casing partition 30 constitute right-hand turn indicating mechanism and all the parts located on the opposite side of the partition constitute left-hand turn indicating mechanism.

Located directly behind the shutters 29 and extending from top to bottom of the casing and terminating longitudinally just short of the inner extremities of the light apertures 18 is an opaque wall-acting light shield 31. By reference to Figs. 7 and 8 particularly it will be seen that the light shield 31 is securely anchored at its top and bottom in channels 32. Those parts of the outer surface of the shield 31 that are exposed to the light apertures 20 are preferably of dull black; whereas, those portions of the outer surfaces thereof exposed to the light apertures 21, when the shutters are extended, are preferably colored bright yellow to match the surface portions of the shutters that are exposed to the apertures 21. Hence, when the shutters are extended, the yellow surfaces of the light shield 31 will fill in the spaces behind the shutters.

The elements 29 are normally yieldably retained in their normal retracted positions by means of independent coil compression springs 33 and said elements 29 are adapted to be projected independently each through the action of a solenoid coil 34. The opposite solenoid coils 34 are axially aligned and are each wound on but electrically insulated from a metallic guide tube 35, preferably of non-metallic material such as brass. The guide tubes 35 are rigidly mounted at their inner ends within the double partition 30 of the casing and at their outer ends the axially aligned guide tubes 35 are rigidly mounted in the ends of the casing lining. Working within each of the guide tubes 35 is a magnetically responsive plunger 36. The inner end portion of each plunger 36 is connected to a laterally opposite element 29 through the medium of a pin 37 and a bracket 38. The pins 37 are rigidly anchored in the inner ends of their respective plungers 36 and work through longitudinal slots 39 in the guide tubes 35. The brackets 38 are rigidly secured to the inner surfaces of their respective cooperating elements 29 by soldering, or the like. The pins 37 work through suitable holes provided therefor in the inner end portions of the brackets 38. Although the shutter-like sliding signal elements 29 are slidably mounted at their upper and lower edges in guide channels 28, the weight of the shutter-like elements 29 and brackets 38 is preferably carried independently of the channels, and for this purpose there is provided a long guide rod 40 that is rigidly mounted at its opposite ends in outturned end portions 41 of the shield plate 31. At its intermediate central portion the guide rod 40 is supported from the shield plate 31 by means of a supporting bracket 42.

The intermediate portions of the brackets 38 work through a longitudinal extended slot 43, the opposite ends of which slot 43 are indicated by 43'. Spaced transversely extended portions of the brackets 38 work over a slide on the guide rod 40. Working slidably over the guide tubes 35 in common with the plungers 36 are collars 44. These collars 44 are slidably locked to the plungers by the pins 37 which work therethrough. The return springs 33 work against the insulated inner ends of the solenoids 34 and are compressed therebetween and the collars 44.

It will now be evident that the shutter-like sliding signal elements 29 will be projected from their inoperative positions to their operative positions as a result of energization of their respective cooperating solenoids 34, and will be returned automatically to their normal inoperative positions by the springs 33 when the solenoids are de-energized. Movements of the elements 29, under the influence of their respective solenoids 34, are limited by engagement of the outer ends of the brackets 38 with their respective end 43' of the slot 43, and inward retracting movements of the elements 29 are positively limited by engagement of the plungers 36 with the central partition 30.

For the purpose of cushioning the operating mechanisms when they approach the ends of their travel on their outward projecting movements, there are provided, within the ends of the guide tube 35, cushioning springs 45 that react against the ends of the casing lining and are operatively engaged by the ends of the plungers 36 through the medium of magnetically inert disc-like elements 46 loosely mounted in the tubes. Cushioning of the shutter-like elements 29 and their operating mechanisms when they approach the ends of their retracting movements is effected by means of coil compression springs 47 mounted on the guide rod 40 between the bracket 42 and sliding brackets 38.

Suitably mounted within the signal casing and inwardly of the shield 31 are small incandescent light bulbs 48, there being, in accordance with the present illustration, two for each side of the casing. To prevent light rays from these light bulbs finding their way through the slot 43 in the shield 31 there is provided an auxiliary light shield 49 that is rigidly anchored to the central partition 30 by a screw, or the like, at 50.

A narrow longitudinally extended slot 51 is provided in that portion of each shutter-like signal element 29 that is in registration with the shaft-like light aperture 21 when the signal elements are retracted. These slots 51 are considerably narrower than the light apertures 21 so that the highly reflecting yellow surfaces of the signal elements 29 are clearly visible through the apertures 21.

The solenoid coils 34 and light bulbs 48 are adapted to be energized from a suitable source of potential B which, in the present instance, may be assumed to be a vehicle's storage battery. Although the signal mechanism is usually located remotely with respect to the vehicle operator and usually at the rear of the vehicle, the signal mechanism may be conveniently controlled by the operator through the medium of a master control switch S that may be assumed to be located on the vehicle's instrument panel or elsewhere within convenient reach and sight of the vehicle operator.

The solenoid 34 of the right-hand turn indicating mechanism (meaning all parts of the mechanism located at the right of center in Figs. 1, 2, 3, 4 and 10) is adapted to be energized from the battery B through a circuit R, and the solenoid coil 34 of the left-hand indicating mechanism (meaning the mechanism located at the left of center in respect to the above noted figures) is adapted to be energized from the battery B through a circuit L. One side of the battery B is grounded at 52 and extending from the opposite side of the battery B is a lead 53 that is common to all circuits and has interposed therein the normally closed contacts 54 of a thermo-type flasher switch F. This flasher switch F is of conventional character comprising the contacts 54, one of which is fixed and the other of which is movable and mounted on the free end of a thermostatic warp bar 55 that warps to close the contacts 54 responsive to heat transmitted thereto from a resistance heating element 56 connected in series with the contacts 54.

The switch S comprises fixed switch contacts 57, 58 and 59 arranged in circumferentially spaced relation about the axis of a pair of cooperating switch arms 60 and 61. The switch arms 60 and 61 are mounted for common rotary movements and are electrically connected to the end of lead 53.

Circuit R comprises, in addition to the lead 53 and interposed contacts 54, switch arm 60, switch contacts 58 or 59, a lead 62, the right-hand solenoid coil 34, and ground connections back to the opposite side of the battery.

Circuit L comprises, in addition to common lead 53 and its interposed switch contacts 54, switch arm 60 or 61, fixed switch contact 57, a lead 63, the left-hand solenoid 34 and ground connections back to the opposite side of the battery.

The right-hand pair of light bulbs 48 are connected in parallel with the circuit R by connecting one side of the filament of each thereof to lead 54 and the other side to ground; and the left-hand pair of light bulbs 48 are connected in parallel with the circuit L by connecting one side of the filament of each thereof to lead 63 and the other side of the filaments thereof to ground.

With this arrangement, it will be obvious that when the gap between leads 53 and 59 is bridged by switch S, circuit R and the parallel circuits of the right-hand light bulbs 48 will be alternately completed and broken repeatedly which will result in intermittent flashing on and off of the right-hand light bulbs 48 and simultaneous intermittent projection of the right-hand shutter-like signal element 29, whereas bridging of the gap between leads 53 and 63 will result in intermittent flashing on and off of the left-hand light bulbs 48 and simultaneous intermittent projection of the left-hand shutter-like signal element 29.

To signal his intention to turn to the right, the operator merely moves the switch arms 60 and 61 in a clockwise direction from the normal inoperative position thereof, shown by full lines in Fig. 10, until contact arm 60 engages its cooperating contact 58; and to indicate a left-hand turn, the operator merely moves the switch arms to the left to bring switch arm 60 into engagement with contact 57. On the other hand, if the operator desires to signal for a stop, he may produce a very effective block signal by simultaneously operating the left and right-hand turn indicators, and this he can quickly accomplish by moving the switch arms 60 and 61 from neutral position to the right until arm 60 engages contact 59, and arm 61 engages contact 57 which closes both the circuit L and the circuit R.

Operation

With the device described, the circuit through the heating coil 56 of flasher switch F is closed immediately upon closing of the vehicle's ignition switch so that the flasher F operates continuously so long as the vehicle's ignition switch is closed. Normally, of course, the signal selector switch S will be retained in the position shown by full lines in Fig. 10 and both the left and right hand turn indicating signal devices will be completely inoperative.

When the operator desires to make a left hand turn, he will indicate such intention by moving the contact 60 into engagement with contact 57, and when the operator intends to turn to the right, he will set the mechanism in condition to indicate this intention by moving the contact 60 into engagement with contact 58 and in which position contact 61 will not yet have been brought into engagement with contact 57. If we assume now that the operator has set the contact 60 of switch S in engagement with contact 57 for the purpose of indicating his intention to turn to the left, the mechanism will operate as follows.

The parallel circuits through the signal light bulbs 48 at the left hand side of the signal will be alternately and repeatedly completed and opened due to the action of the flasher switch F, thereby rendering the left hand light bulbs 48 intermittently operative with the result that the light rays generated thereby will be projected through the direction indicating light apertures 18 at the left hand side of the signal casing. These locally generated light rays thusly projected through the direction indicating apertures 18 will produce a left hand turn indication that is very highly effective under conditions of darkness but which will be very ineffective during conditions of bright daylight or in the presence of strong artificial light. Simultaneously with the closing of the circuits through left hand signal lights 48, the circuit through the left hand solenoid coil 34 will be completed through switch F which, of course, will open and close the circuit through the solenoid 34 with the same frequency as it opens and closes the circuits through the light bulbs 48. When the circuit through the left hand coil 34 is thusly intermittently completed and broken, the shutter-like signal element 29 of the left hand indicator will be alternately moved from its retracted normal position shown in Figs. 1, 2, 5 and 6 to its extended operative position shown in Fig. 3, for example, and then returned to its normal inoperative position. Of course, the shutter element 29 will be moved from its inoperative to its operative position each time the circuit through the left hand solenoid coil 34 is completed and will be returned to its normal position each time the circuit through said coil is broken, the latter function taking place due to the action of spring 33 thereof. This to and fro oscillatory movement of the left hand shutter will alternately bring the arrow shaped yellow reflecting surface of the signal element 29 into and out of registration with the arrow shaped left-hand sight passage 20 in definite timed or synchronized relation with respect to the operative intervals of the left hand signal lamps 48. That is, each time that the parallel circuits through the left hand lamps 48 and left hand solenoids 34 are completed, the lamps will become operative and the direction indicating reflecting surface of the left hand signal element 29 will be moved in the sight opening 20 from an inoperative to an operative position in the direction of turn indication. The reflecting surface of signal element 29 will, therefore, move in the direction of indication each time the left hand light bulbs become operative, and such movement will be visible through the arrow shaped sight opening 20 of the left hand indicator. This intermittent flashing of the reflecting surface of signal element 29 into and out of view will produce a very effective direction turn indication under conditions of extreme daylight or in the presence of sufficient artificial light but will be substantially ineffective in conditions of darkness.

The right hand turn indicating mechanism being an exact duplicate of the left hand turn mechanism will operate in exactly the same manner described in connection with the left hand turn indicating mechanism. Also, it may be stated that if the operator intends to stop, a very effective stop signal by either day or night can be produced by setting both left and right hand indicators operative simultaneously and which will be accomplished by moving switch contact 60 into engagement with switch contact 59, which act will bring contact 61 into engagement with contact 57.

Some of the important advantages of the device described are as follows, to wit, (a) under conditions of extreme darkness and in the absence of strong artificial light, the flashing signal produced by locally generated light rays projected through the signal apertures 18 will be visible at a very safe distance; (b) under conditions of bright daylight or in the presence of strong artificial light, the flashing signal produced through apertures 18 will be substantially ineffective but under these conditions the flashing signal produced by reflected remotely generated light rays will be clearly visible at a safe distance; (c) during the transition period between daylight and darkness, the signals flashed by projection and reflection will be both more or less effective. That is, the flashing signal by locally generated projected light rays will become progressively more effective as it becomes increasingly darker, while under the same conditions the flashing signal produced by reflection will become progressively weaker and in a certain intermediate stage each will be individually relatively weak, but together will produce an effective signal at a safe distance; (d) under conditions of extreme darkness the operator of a car approaching the signal-equipped vehicle will be able to see the projected light ray signal at a much greater distance than the reflected signal and this in spite of the fact that the headlights of the approaching car may be directed toward the signal. However, as the approaching car with its headlights on comes closer, the increasing tendency of the approaching car's headlights will tend to nullify or wash out the projected ray signal and render it relatively weaker but by the same action will increase proportionately the brilliance of the reflected ray signal until a point is reached when the approaching car is very close where the reflected ray signal may actually be much brighter than the projected ray signal.

From what has been said above, it will be evident that the method and mechanism described produce a very effective direction turn indication under all conditions of light and darkness. In practice it is found that the effectiveness of the indication under conditions of partial darkness is greatly increased by flashing the projected and reflected signals in simultaneous relation as

What I claim is:

1. In a vehicle direction turn indicator, an opaque surface having a light pervious signal aperture, a source of light located behind the signal aperture-equipped opaque surface, a shutter associated with the signal aperture for alternately opening and closing a material portion of the signal aperture and being movable from an aperture closed position to an aperture open position in the direction of the turn indication, whereby to progressively open the signal aperture in the direction of turn indication during the aperture opening function of the shutter, and mechanism for operating the shutter to alternately close and open the signal aperture.

2. In a direction turn indicator, a casing having an exposed opaque wall provided with a light pervious signal aperture, a source of light located within the casing back of the said signal aperture-equipped wall thereof, an opaque shutter element movable in the casing and having a light aperture therein, and mechanism operative to move the shutter longitudinally of the direction of turn indication while said apertures are in registration, whereby to vary the length of the illuminated portion of the casing wall signal aperture.

3. In a vehicle direction turn indicator, an opaque wall having a light pervious signal aperture therein, said signal aperture being shaped to imply direction, a movable signal element mounted back of the opaque apertured wall in parallel relation thereto and for oscillatory sliding movements parallel to the direction of indication, said movable signal element having a light reflecting surface shaped to approximately correspond to the shape of the light pervious signal aperture and which is movable into and out of registration with the signal aperture under oscillatory movements of the signal element, and means for imparting such oscillatory movements to the signal element, the surface of the opaque wall surrounding the aperture therein and the said reflecting surface of the signal element being of highly contrasting colors.

4. In an intention to turn indicating device for vehicles, means including an electric lamp and a circuit therefor for locally generating and intermittently projecting light rays from the indicating device in a pattern indicating direction, and means for intermittently reflecting a moving pattern of remotely originating light rays in a pattern indicating the same direction as that of the projected light ray pattern, said last named means including a light aperture closely associated with the said pattern of projection of locally generated light rays and a signal element movable over one side of said aperture.

5. In a direction turn indicating device for vehicles, a casing provided in one exposed face with light pervious passages arranged to form horizontally spaced direction indicating patterns each indicating the same direction, local means generating and intermittently and repeatedly projecting locally originated light rays outwardly through one of said direction indicating aperture patterns, and a movable signal element located within the casing and having a reflecting surface that is adapted to be moved into and out of registration with the other aperture pattern under horizontal movements of the signal element, and power mechanism automatically moving the signal element horizontally into registration with its cooperating light aperture pattern each time the said means causes the locally generated light rays to be projected through the other light aperture pattern.

6. In a direction turn indicator for vehicles, a casing having an exposed wall with a signal light passage shaped to form a pattern indicating direction and having in closely associated horizontally spaced relation to said passage a sight opening of a pattern indicating the same direction, an electric lamp positioned in the casing to project light waves outwardly through said signal light passage, a signal element horizontally slidably mounted in the casing and having an indicating reflecting surface indicating the same direction as said sight opening and being movable into and out of view through the signal opening under horizontal sliding movements of the signal element, yielding means normally maintaining the signal element in an extreme position wherein its reflecting surface is out of registration with the sight opening, electric motor means moving the signal element to an opposite extreme position wherein the direction indicating signal surface thereof is visible through the sight opening, circuits for the electric lamp and motor means, a common manual control switch for said circuits, and an automatic flasher switch common to said circuits, whereby when the manual control switch is closed simultaneous turn indications will be given by the projection of locally generated light rays and reflected remotely originating light rays.

7. In a direction turn indicator for vehicles, means for intermittently and repeatedly projecting light rays in a pattern indicating direction, said means including an electrically operated light source and means for rendering the same alternately operative and inoperative to project signalling light rays, and means closely associated with the projected light ray pattern and located in the same vertical plane for intermittently and repeatedly reflecting remotely originating light rays in a pattern-indicating the same direction, said last-named means comprising a reflecting surface and mechanism for bringing the same alternately into and out of signal reflecting position.

8. In a vehicle turn indicator, a casing having an exposed opaque wall provided with a light pervious signal aperture, a shutter element located within the casing and movable longitudinally of the direction of turn indication, said shutter element having a face portion adapted to be moved into and out of registration with the casing signal aperture under movements of the shutter longitudinally of the direction of indication and which face portion possesses a very high degree of reflectivity with respect to that of the said casing wall and being of a color possessing a high degree of visibility with respect to the opaque portion of said casing wall, and power mechanism operating the shutter element to bring the said highly visible face portion intermittently into and out of registration with the said light pervious signal aperture, said light pervious signal aperture being disposed parallel to the direction of indication, and said signal aperture being tapered toward an end thereof facing in the direction of indication.

9. In a vehicle turn indicator, a casing having an exposed opaque wall provided with a light pervious signal aperture, a shutter element located within the casing and movable longitudinally of the direction of turn indication, said shutter element having a face portion adapted to be moved into and out of registration with the casing signal aperture under movements of the shutter longitudinally of the direction of indication and which face portion possesses a very high degree of reflectivity with respect to that of the said casing wall and being of a color possessing a high degree of visibility with respect to the opaque portion of said casing wall, said face portion of the shutter being pointed in the direction of indication, and power mechanism operating the shutter element to bring the said highly visible face portion intermittently into and out of registration with the said light pervious signal aperture.

10. In a vehicle turn indicator, a casing having an exposed opaque wall provided with a light pervious signal aperture, a shutter element located within the casing and movable longitudinally of the direction of turn indication, said shutter element having a face portion adapted to be moved into and out of registration with the casing signal aperture under movements of the shutter longitudinally of the direction of indication and which face portion possesses a very high degree of reflectivity with respect to that of the said casing wall and being of a color possessing a high degree of visibility with respect to the opaque portion of said casing wall, and power mechanism operating the shutter element to bring the said highly visible face portion intermittently into and out of registration with the said light pervious signal aperture, the said light pervious signal aperture and shutter element being disposed parallel to the direction of indication and each thereof being tapered toward the end thereof facing in the direction of indication.

ARTHUR W. ROHLEN.